July 28, 1959  A. DOUTY  2,897,436
INDICATING AND CONTROL APPARATUS FOR ELECTROLYTE
CONCENTRATION AND THE LIKE
Filed Sept. 29, 1954
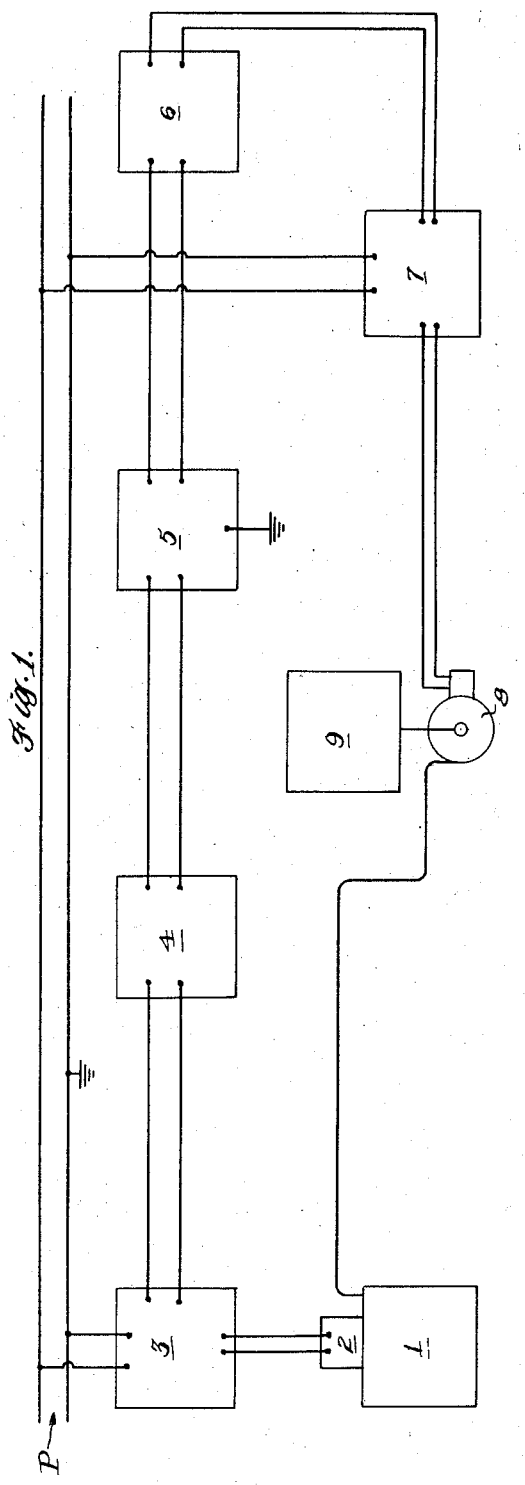
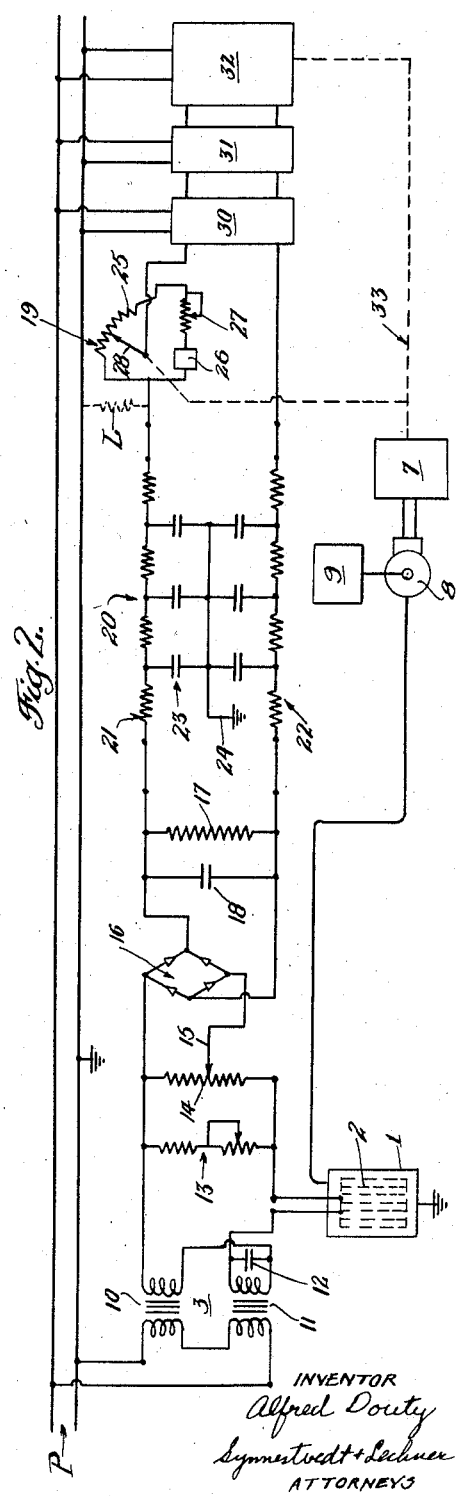
INVENTOR
Alfred Douty
Synnestvedt + Lechner
ATTORNEYS

United States Patent Office 2,897,436
Patented July 28, 1959

2,897,436

INDICATING AND CONTROL APPARATUS FOR ELECTROLYTE CONCENTRATION AND THE LIKE

Alfred Douty, Wyncote, Pa., assignor to Amchem Products, Inc., Ambler, Pa., a corporation of Delaware Application September 29, 1954, Serial No. 459,020

2 Claims. (Cl. 324—30)

This invention relates to industrial control apparatus and, in particular, relates to apparatus for the measurement and control and/or indicating the concentration of a solution of electrolytes.

The invention contemplates a conductance cell containing a liquid whose electrolyte concentration is to be measured, the cell being adapted to generate a signal which is used to operate or condition apparatus for maintaining the concentration of the solution within a desired limit.

Heretofore, apparatus has been available for measuring and controlling the concentration of solutions of electrolytes. Such apparatus is generally of the "feedback" type in which a signal generated by variation in the medium to be controlled or maintained at some desired value is used to actuate apparatus which alters the medium in a direction tending to restore the same to the desired value. Most of the known types of apparatus make use of a sensing element, for example, a conductance cell having a pair of electrodes immersed in the solution to be controlled. Power from an A.C. supply is fed to the cell and variation in the conductivity of the solution between the electrodes due to change in concentration varies the magnitude of the generated A.C. signal. This sensing signal is compared to a standard or known signal and the resultant or difference signal is used to control automatic servo means which operates external apparatus to replenish the supply of electrolyte to the solution. In such apparatus A.C. is used across the electrodes of the cell to avoid polarization effects and the signal is balanced against a known standard A.C. signal of the same frequency.

Such a system cannot function correctly over extended periods of time without manual adjustment of phase corrective circuit components. The required constant attention is not compatible with the requirements of modern automatic industrial control systems.

The reason for the foregoing is that in service, the conductance cell electrodes accumulate films of dirt, corrosion products, etc., which cause a shift in the effective electrical capacitance of the cell. The phase angle of the sensing signal is thus altered with respect to that of the standard comparison signal, so that a null balance is no longer possible unless this phase angle change is compensated by suitable manual adjustment, for example, by means of a variable condenser.

The present invention overcomes the above drawback. The apparatus of the invention is built around the discovery that while accumulations of dirt and chemical film appreciably affect phase angle, they only slightly affect the impedance of the electrodes. In other words, while accumulations of dirt and chemical film have considerable effect on the phase angle of a signal or voltage across the electrodes, they have little effect on the magnitude thereof. Accordingly, I have designed a system which utilizes a sensing signal from a conductance cell which is independent of the phase change. Thus, the control portion of the system, which is activated by the sensing signal, is independent of phase change.

One of the principle advantages of the apparatus of the present invention is that it can be continuously operated for extended periods of time without calibration of the electrodes of the conductance cell.

According to the invention, a regulated source of A.C. voltage is series connected with the electrodes of a conductance cell, which is immersed in the solution to be controlled. Any change in impedance of the solution due to change in concentration of electrolyte causes a corresponding change in an A.C. signal or voltage generated across a circuit component. This voltage is rectified and then fed through an isolating filter to a D.C. self-adjusting potentiometer supplied with a known or standard D.C. voltage. The sensing voltage and the known voltage are compared and the difference voltage is used to actuate a servo motor which, in turn, controls the operation of a device for restoring the proper concentration to the solution.

By rectifying the A.C. sensing signal, I avoid the effects of phase change while at the same time, the A.C. across the conductance cells avoids the effects of polarization. Thus, it will be apparent that the advantages of A.C. are utilized while the disadvantages are eliminated.

A converter of the vibrator or commutating type is often used in my system as a component of the self-balancing potentiometer and this device may give rise to unwanted A.C. potentials, which might be rectified and appear as part of the sensing signal. In the arrangement of the invention, I have avoided the foregoing by using an isolating filter between the rectifier and the D.C. potentiometer.

In addition to the above, the isolating filter serves to prevent the rectifier from rectifying spurious A.C. potentials due to leakage between the ungrounded side of the A.C. source and any of the circuitry beyond the rectifier.

The details of the construction of the invention and other advantages and features thereof will be apparent from the following description and drawings wherein:

Figure 1 is a block diagram illustrating an arrangement of the invention as used in controlling the solution of electrolyte; and Figure 2 is a schematic diagram illustrating in more detail certain of the components of the arrangement of Figure 1.

In Figure 1 a tank 1 carries the solution whose concentration is to be controlled. A conductance cell 2 for developing a sensing signal is immersed in the liquid in the tank. The conductance cell is connected to a source 3 of regulated A.C. voltage, which is supplied from a commercial A.C. power source P. The A.C. sensing signal furnished by the cell is fed to adapter circuits generally indicated by the numeral 4. In the adapter circuits the A.C. sensing signal is regulated and then fed through an isolating filter 5 to a D.C. self-balancing potentiometer 6. In the potentiometer the sensing signal is compared or balanced against a known signal and the resultant signal is sent to an actuator device generally indicated by the numeral 7, which responds by controlling the operation of a feeder 8, which transfers a chemical or concentrate from the reservoir 9 to the tank 1 to restore the solution to the proper concentration.

Figure 2 shows in somewhat greater detail certain of the devices mentioned in Figure 1. The voltage regulator 3 comprises two step-down transformers 10 and 11 whose primaries are connected in series and fed from the A.C. power source P. The secondaries of the transformers are connected in series opposition and the transformer 11 operates with a relatively saturated core, the secondary of this transformer being tuned with a capacitor 12. The effect of the foregoing arrangement is to provide a source of low constant A.C. voltage.

The conductance cell 2 mounted in the tank 1 is series connected with the voltage regulator or low voltage source. The cell as shown is the so-called dipping type and it will be understood that the cell may take other suitable forms. The low voltage source and the cell are connected with the resistor element 13, which may be variable and calibrated in terms of solution temperature so as to provide compensating means as required by the temperature of the solution. A voltage dividing resistor 14 is connected across the compensating resistor 13. Thus, it will be apparent from the foregoing that an A.C. sensing signal will be developed across the resistor 14, this voltage corresponding to the conductivity of the solution in tank 1, and thus, to the concentration of electrolyte therein.

By adjustment of the arm 15, a desired proportion of the A.C. sensing signal may be fed to the input of a rectifier 16. As shown, this rectifier is a full wave, four-element copper oxide type but may take other convenient forms, for example, full or half-wave of the semi-conductor or vacuum type. The output of the rectifier is connected to the load resistor 17, and a capacitor 18 may be provided to take out the ripple in the rectified signal.

Thus, there appears across the resistor 17 a D.C. signal whose magnitude corresponds to the concentration of the electrolyte in the solution to be controlled. While the A.C. sensing signal fed to the rectifier may change in phase with respect to the A.C. supply due to dirt accumulations, chemical films, etc., on the electrodes of the cell, the magnitude of the signal will not change because, as I have discovered, the dirt and chemical film do not appreciably affect impedance. Thus, the magnitude of the D.C. sensing signal across the load resistor 17 is not affected by electrode impedance changes and furthermore, not affected by phase change.

By suitably using this D.C. sensing signal, I can provide control equipment which can operate for protracted periods of time with no or the very minimum of attention. Such control equipment has long been desired in industry.

The sensing signal developed across the load resistor 17 is fed to a D.C. self-balancing potentiometer 19 via the isolating filter generally designated by the numeral 20. This filter preferably comprises a plurality of series connected line resistors 21 and 22 and line-to-line capacitors 23, which are center-tapped to ground as indicated at 24. The function of this isolating filter will be commented on more in detail hereinafter.

The D.C. potentiometer 19 comprises a slide wire resistor 25, which is fed from a standard source of D.C. voltage 26 through a calibrated resistor 27, one end of the slide wire being connected to the filter 20. The known voltage impressed across the portion of resistor 25 up to the contact at arm 28 is arranged to be opposed to that across the load resistor 17. As shown in the drawing, the movable arm 28 of the potentiometer is connected to a converter 30 and a proportional amount of the known voltage across resistor 25 may be picked off by movement of the arm. The other side of the converter is connected to filter 20.

As will be apparent, the arrangement puts the sensing voltage and the known voltage in series opposition. Thus, by movement of the arm 28, a resultant voltage is fed to the converter. This voltage may be of some finite value or be zero, depending upon the position of arm 28.

The converter 30 operates to change the resultant D.C. voltage to A.C. The converter may be of any standard form such as vibrator or commutator devices, either of which is energized by power from source P. The A.C. signal from the converter is amplified by a standard amplifier 31 supplied with A.C. from source P and then fed to servo motor 32. The servo motor may take the form of a two-phase motor, one phase being fed from A.C. source P and the other phase being fed by the amplifier 31.

The speed of the servo motor depends upon the magnitude of the voltage received from the amplifier and the direction in which the motor turns depends upon the phase relationship between the signal from the amplifier and the signal from source P.

The shaft of the motor 32 is connected as indicated at 33 to the movable arm 28. As the motor rotates, the arm moves to balance out or "null" the sensing signal and when the resultant signal is zero, the motor stops. The motor shaft is also connected, as indicated at 33, to the activator device 7 and controls the operation of this device to supply chemicals to the tank 1, as has already been mentioned.

The purpose of the isolating filter 20 and the advantages thereof will next be described.

As is known, a converter of the vibrator or commutator type may give rise to spurious A.C. voltages due to the rapid rate of change of current during the "make and break." Such potentials could be sent out from the terminals of the converter, back through the lines, fed into the rectifier, be rectified, and appear as part of the sensing signal. Depending upon the magnitude and phase of such potentials, the sensing signal would be considerably in error. With the isolating filter 20, such potentials are filtered out and hence, cannot reach the rectifier.

In addition to the above, the isolating filter serves another purpose. For example, assume there was a leak, such as indicated at L, from the ungrounded side of the power source P to the potentiometer resistor 25. The solution in the tank 1 is grounded because of tank connections to water and drain pipes, etc. Thus, both of the electrodes of the conductance cell are grounded through a low resistance. Now, depending upon which output terminal of the rectifier is connected to the leak, two paths to ground exist through the rectifier, associated circuits and cell electrodes. These circuits are not identical because the paths to ground through the two electrodes include different circuit elements. Thus, different A.C. potentials can exist across the resistors 13 and 14. The rectifier can, of course, rectify such spurious potentials which would appear as part of the sensing signal. The isolating filter attenuates any such A.C. voltage leaks and thus, no spurious potentials are present to be acted upon by the rectifier. Since the full-scale actuating voltage of the potentiometer may be only 50 mv., the spurious potentials for a 120 volt line may be several times as great. The foregoing will illustrate the importance of the isolating filter.

It is desired to mention that certain of the components described heretofore may take different form. For example, the movement or the position of the arm 28 of the potentiometer may be used as an indicating device, or the servo motor 32 may, in addition to driving the activating device, be used to drive an indicating device such as a recorder. The activator device 7, while indicated as being electrically operated (Figure 1) may be pneumatically or hydraulically operated. Also, the feeder 8, while indicated as a liquid pump, may be a dry feeder or an electrically or pneumatically operated valve.

In summary, from the detailed description which has just been given, it may be seen that the present invention resides in the provision of means for measuring, controlling or recording the concentration of an electrolyte solution which includes as its essential coacting elements a first circuit including a source of regulated alternating current voltage and a cell having electrodes immersed in an electrolyte; a second circuit including a rectifier and including means for abstracting from the first circuit all or a desired portion of the voltage across a circuit element other than the fixed voltage source; and a third circuit which includes a portion of the second circuit carrying rectified current, and which also includes the input terminals of a D.C. potentiometer.

A further elaboration of the invention includes the employment of a D.C. potentiometer of the self-balancing type. The system may also include recording and/or controlling means, actuated by the closed feed-back loop including the servo motor of the self-balancing potentiometer as hereinabove indicated.

I claim:

1. Apparatus for controlling the concentration of a solution of electrolytes comprising: a first closed circuit including a regulated source of A.C. voltage, a conductance cell having electrodes immersible in a solution of electrolytes and a variable load resistor calibrated in terms of solution temperature to develop an A.C. sensing voltage in accordance with change in concentration of electrolytes; a second closed circuit connected with said first circuit and including means to abstract a desired proportion of the sensing voltage across said load resistor and a rectifier to rectify said proportion of the sensing voltage; a third closed circuit connected with said second circuit for receiving said rectified voltage, the third closed circuit including a D.C. self-balancing potentiometer; and mechanism connected with said third circuit providing for regulation of the concentration of electrolytes in said solution.

2. In apparatus for controlling the concentration of a solution of electrolytes: a first circuit including a source of regulated A.C. voltage, a conductance cell having electrodes immersible in a solution of electrolytes and a load resistor adapted to develop an A.C. sensing voltage in accordance with change in concentration of electrolytes; a second circuit connected with said first circuit including means to abstract from said first circuit a desired proportion of said sensing voltage and a rectifier to rectify said sensing voltage; and a third circuit connected with said second circuit for receiving said rectified voltage, the third circuit having terminals for connection to apparatus to effect a change in concentration of electrolyte in said solution in accordance with said rectified voltage, said load resistor being variable and calibrated in terms of solution temperature.

References Cited in the file of this patent

UNITED STATES PATENTS

| | | |
|---|---|---|
| Re. 23,282 | Thomson | Oct. 10, 1950 |
| 1,951,035 | Parker | Mar. 13, 1934 |
| 2,217,626 | Strang et al. | Oct. 8, 1940 |
| 2,224,382 | Douty | Dec. 10, 1940 |
| 2,621,315 | Chuckler | Dec. 9, 1952 |
| 2,626,620 | Smith | Jan. 27, 1953 |
| 2,638,784 | Cesaro et al. | May 19, 1953 |
| 2,656,526 | Mackay | Oct. 20, 1953 |
| 2,659,234 | Harrison | Nov. 17, 1953 |
| 2,769,141 | Richardson | Oct. 30, 1956 |

FOREIGN PATENTS

| | | |
|---|---|---|
| 502,918 | Belgium | May 1951 |